United States Patent
Antikidis

(10) Patent No.: US 6,798,984 B2
(45) Date of Patent: Sep. 28, 2004

(54) IMAGE PICK-UP DEVICE ON BOARD A SPACE CRAFT, SPACE CRAFT AND IMAGE SENSING METHOD COMPRISING SAME

(75) Inventor: Jean-Pierre Antikidis, Castanet-Tolosan (FR)

(73) Assignee: Centre National d'Etudes Spatiales (FR)

(*) Notice: Subject to any disclaimer, the term of this patent is extended or adjusted under 35 U.S.C. 154(b) by 0 days.

(21) Appl. No.: 10/297,532

(22) PCT Filed: Jun. 6, 2001

(86) PCT No.: PCT/FR01/01741

§ 371 (c)(1), (2), (4) Date: Jul. 18, 2003

(87) PCT Pub. No.: WO01/95614

PCT Pub. Date: Dec. 13, 2001

(65) Prior Publication Data

US 2004/0101294 A1 May 27, 2004

(30) Foreign Application Priority Data

Jun. 6, 2002 (FR) .............................. 00 07201

(51) Int. Cl.$^7$ .............................................. G03B 39/00
(52) U.S. Cl. ...................... 396/13; 348/144; 348/208.7
(58) Field of Search ........................... 396/13; 359/554; 348/144, 208.7

(56) References Cited

U.S. PATENT DOCUMENTS 5,585,633 A    12/1996  Tulet ....................... 250/338.3

FOREIGN PATENT DOCUMENTS

EP             697786 A    2/1996  .......... H04N/5/225

OTHER PUBLICATIONS

Patent Abstract of Japan, vol. 014, No. 225, (E–0927), (May 14, 1990) & JP 02 058481A (NEC Corp), (Feb. 27, 1990).
Patent Abstracts of Japan, vol. 016, No. 463 (p. 1428); JP 04 166920A (Toshiba Corp). (Jun. 12, 1992).
Patent Abstracts of Japan, vol. 2000, No. 04 & JP 2000 013665A (Fuji Photo Film Co, Ltd.), (Jan. 14, 2000).
International Search Report, Oct. 9, 2001.

Primary Examiner—W. B. Perkey
(74) Attorney, Agent, or Firm—Morgan & Finnegan, LLP

(57) ABSTRACT

The present invention provides a camera device for mounting on board a spacecraft, the camera device having at least one observation sensor and displacement means (4, 5, 6, 7, 8, 9) for controlled displacement of said device relative to the spacecraft with at least one degree of freedom, the device being characterized in that said displacement means comprise at least one transducer of an active material suitable for deforming dynamically under the effect of a variable electric and/or magnetic field, together with driver means suitable for controlling the transducer so as to displace the observation sensor in compliance with a variable control relationship adapted to compensating movements induced by the flight dynamics of the satellite.

24 Claims, 5 Drawing Sheets

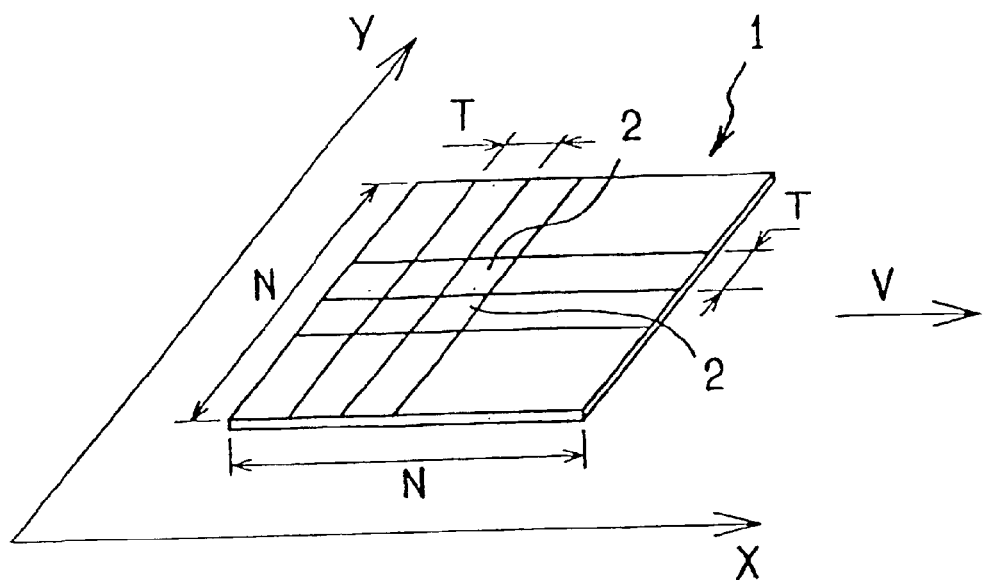
FIG_1
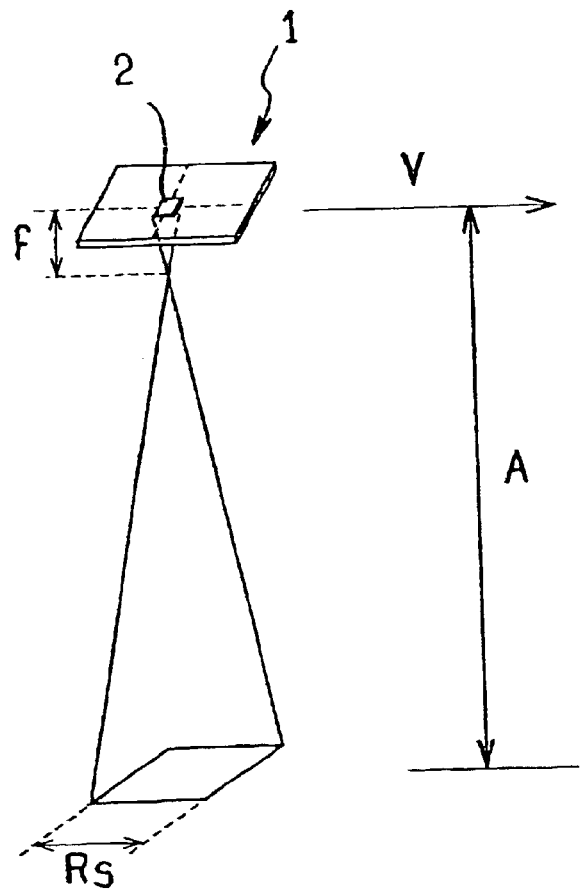
FIG_2

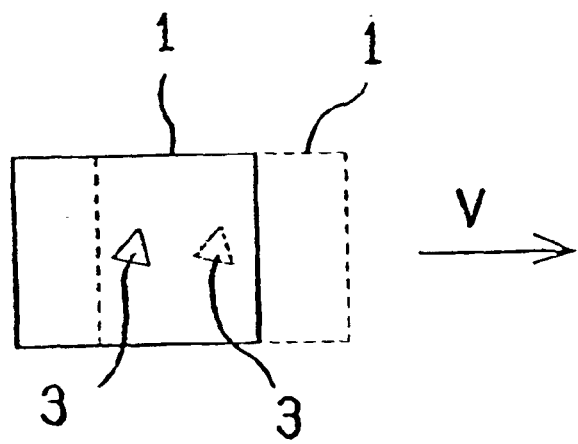
FIG_3
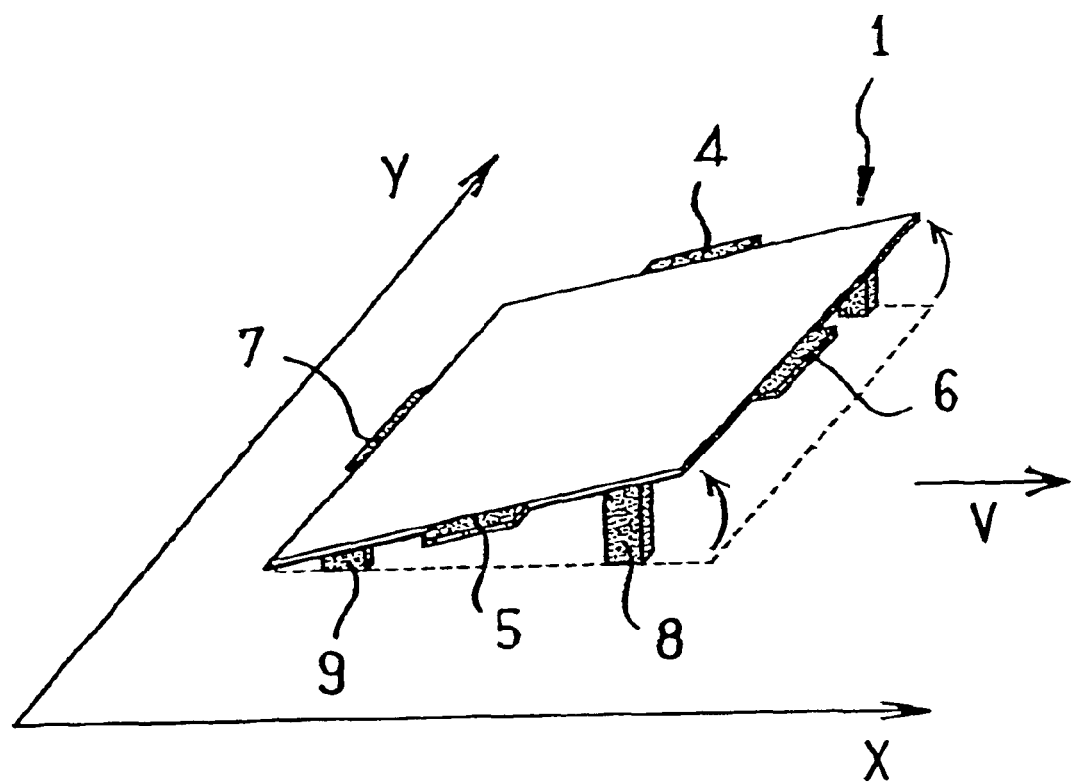
FIG_6

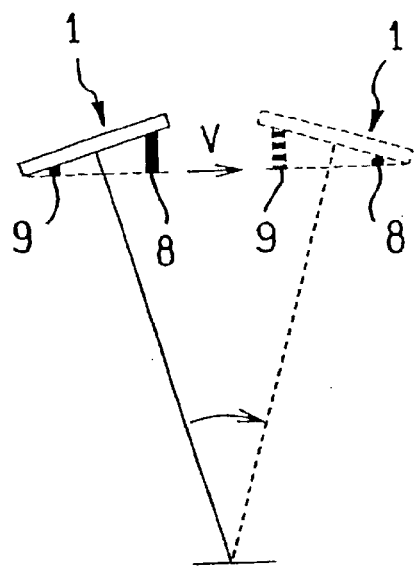
FIG_7
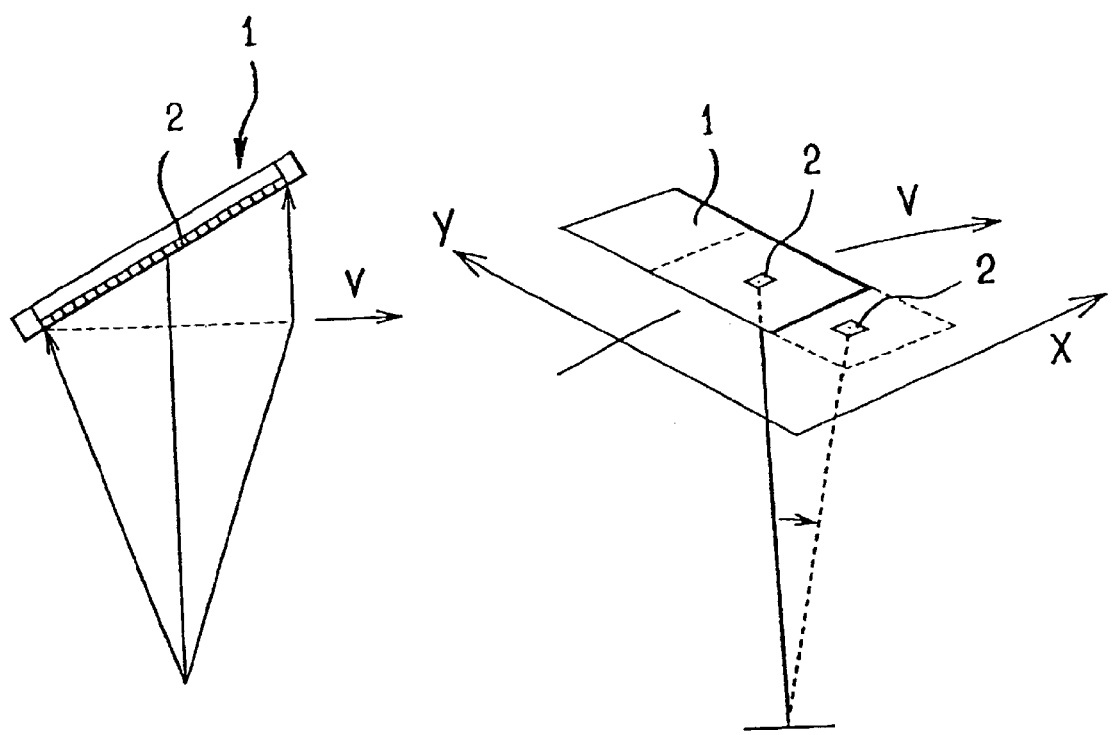
FIG_8
FIG_9

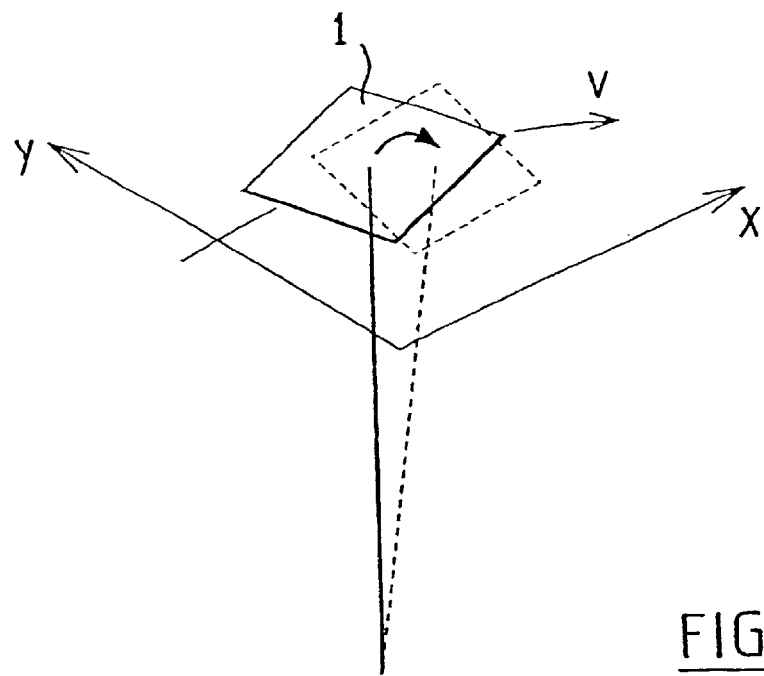
FIG_10
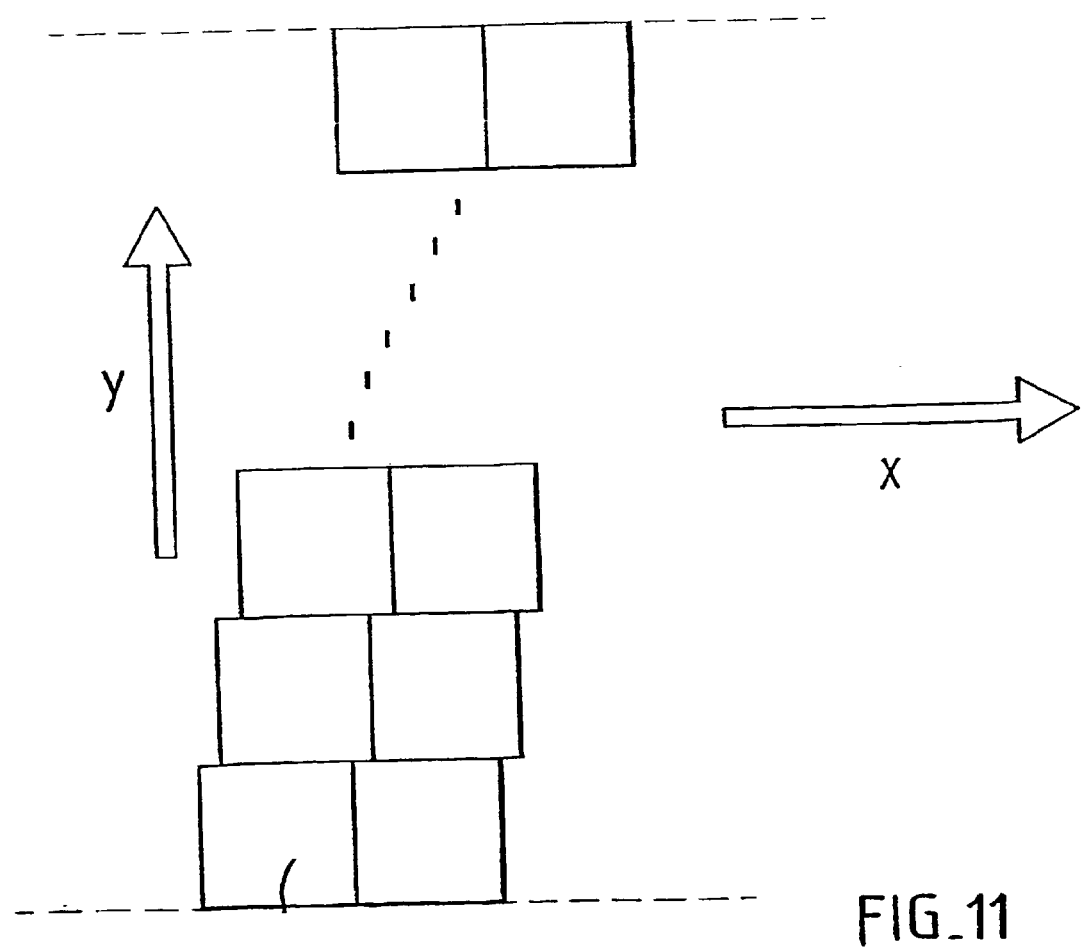
FIG_11

IMAGE PICK-UP DEVICE ON BOARD A SPACE CRAFT, SPACE CRAFT AND IMAGE SENSING METHOD COMPRISING SAME

The invention relates to the field of observation and imaging from a spacecraft. More particularly, in one aspect, the invention provides a camera device on board such a spacecraft. For example, the camera device may include a charge-coupled device (CCD) sensor matrix. Such CCD sensors are also referred to below as "photosensitive charge transfer elements".

More particularly, the invention relates to such camera devices including means for compensating smearing due to movements of the spacecraft relative to the object to be observed and/or whose image is to be conserved.

For example, the invention can be used for imaging the ground from a satellite. Under such circumstances, in order to obtain good resolution, it is necessary to ensure that sufficient energy reaches each sensor during the time the satellite travels a distance corresponding to the desired resolution on the ground.

Known sensor matrices that are available on the market present radiometric performance requiring an exposure time of about 500 microseconds ($\mu$s) for a signal-to-noise ratio of 40 decibels (dB). For a satellite traveling at 8 kilometers per second (km/s) with ground resolution $R_s$ equal to 1 meter (m), then exposure time cannot exceed $\frac{1}{8}^{th}$ of a millisecond (ms), i.e. 120 microseconds ($\mu$s). This exposure time should even be shorter if it is desired maintain good image sharpness.

The quantity of light picked up by each sensor during such an exposure time is therefore insufficient.

To obtain the necessary quantities of light, telescopes have been used with apertures that are 3 to 4 times that which is required by diffraction conditions, so as to pick 10 times more energy. However such telescopes are heavy and bulky (with their weight increasing with the square of their aperture).

Another way of obtaining a sufficient quantity of light is to lengthen exposure time and to compensate smearing during the exposure time by synchronizing displacement of the camera device relative to the satellite as a function of the motion of the satellite along its trajectory. This compensation of smearing is sometimes achieved by modifying light paths, by moving a mirror, a lens, etc.

Document U.S. Pat. No. 5,460,341 describes a camera device for use on board a satellite or other spacecraft, the camera device including a smearing compensation system to correct displacements along an optical axis, focusing displacements of optical parts, the position of the camera device itself relative to the craft on which it is fixed, etc. That compensation device includes linear actuators for adjusting the position of the camera device relative to the spacecraft by controlled displacement in several degrees of freedom. The actuator comprises a motor having a moving coil or a moving magnet. Those linear actuators are of the contactless type, i.e. there is no friction contact between the moving parts relative to one another. Unfortunately, such devices become unusable when it is desired to obtain very high resolution in the compensation movement. Under such circumstances, extremely precise displacements and very short response times are required, but cannot be obtained with those prior art camera devices.

An object of the invention is to provide camera devices with a displacement mechanism that is more precise and that has a response time that is very short.

According to the invention, this object is achieved by a camera device for mounting on board a spacecraft, the camera device having at least one observation sensor and displacement means (4, 5, 6, 7, 8, 9) for controlled displacement of said device relative to the spacecraft with at least one degree of freedom, the device being characterized in that said displacement means comprise at least one transducer of an active material suitable for deforming dynamically under the effect of a variable electric and/or magnetic field, together with driver means suitable for controlling the transducer so as to displace the observation sensor in compliance with a variable control relationship adapted to compensating movements induced by the flight dynamics of the satellite.

This type of material makes it possible to obtain displacement of the entire camera device relative to the spacecraft with positioning that is rigid, with high precision, and practically without any time delay and without using mechanical structures proper.

The use of an active material suitable for deforming is under the effect of an electric field and/or a magnetic field, typically a piezoelectric material or a magnetostrictive material, can be envisaged only for displacements that are very small. However, the optical resolutions that were accessible with prior art devices were such as to require compensation displacements of an amplitude that was too great for it to have been possible to envisage using such materials.

The camera device of the invention may present the following advantageous but optional characteristics taken separately or in combination:

- the displacement means comprise a plurality of transducers, each transducer producing displacement of the sensor relative to the spacecraft that is orthogonal relative to the displacement produced by each other transducer;
- servo-control means are also provided for each transducer, suitable for compensating disturbing movements affecting the position of each sensor relative to an object to be observed;
- the active material is mounted directly on a matrix of observation sensors to form an integrated structure; and
- each observation sensor is a photosensitive charge transfer element.

In another aspect, the invention provides a device for causing a camera device to be displaced in controlled manner in at least one degree of freedom relative to the spacecraft. It further comprises displacement means comprising a transducer of an active material suitable for deforming under the effect of an electric field and/or a magnetic field. Such a device makes it possible in particular to compensate smearing associated with the movements of a spacecraft relative to an object that is remote from the craft, and in particular movements corresponding to displacements along a trajectory.

Such a device, coupled with a control system that generates a voluntary displacement relationship depending on the behavior of the platform on which the camera device is mounted, together with a camera device of the desired type, makes it possible at negligible extra cost and weight to provide a function serving to obtain maximum resolution and scanning width for an optical system carried by a spacecraft, without giving rise to energy losses.

In yet another aspect, the invention provides a spacecraft including a camera device as specified above.

In yet another aspect, the invention provides a method of imaging in space, the method including an operation consisting in displacing a camera device relative to a spacecraft, the method being characterized in that this operation is implemented by applying an electric field and/or a magnetic field to deform an active material interposed between the camera device and the spacecraft, and in that said transducer is driven in such a manner as to displace the observation sensor in compliance with a variable control relationship adapted to compensating the movements induced by the flight dynamics of the satellite.

In advantageous but optional manner, the method of the invention presents the following characteristics taken independently or separately:

- it includes an operation consisting in compensating the smearing associated with the movements of a spacecraft relative to an object to be observed that is remote from said spacecraft, and in particular the movements corresponding to the displacement of said spacecraft along a trajectory;
- it includes an operation consisting in using the active material to cause a matrix of observation sensors extending mainly in a plane to tilt relative to the tangent of the trajectory of the spacecraft;
- it includes an operation consisting in taking a first image of the object to be observed from a first position on the trajectory, and then a second image of said object from a position downstream from said first position, in order to form a stereoscopic image of the object;
- it includes an operation consisting in displacing the camera device laterally relative to the trajectory of the spacecraft to form a stereoscopic image of the object;
- it includes an operation consisting in causing the camera device to turn about an axis perpendicular to the trajectory in order to form a stereoscopic image of the object to be observed; and
- it includes an operation consisting in taking a plurality of images corresponding to the camera device occupying positions that are juxtaposed beside one another by displacing the camera device between taking two images, the device being displaced laterally relative to the trajectory of the spacecraft so as to form, after processing all of the images, an image of the object to be observed that corresponds to a field that is wider than that which would be obtained using only one of said images.

Other aspects, objects, and advantages of the invention are better understood on reading the following detailed description. The present invention is also better understood with the help of references to the drawings, in which:

FIG. 1 is a diagrammatic perspective view of a matrix of photosensitive charge transfer elements forming part of a camera device in accordance with the present invention;

FIG. 2 is a diagrammatic perspective view of an image being taken by means of a matrix of the type shown in FIG. 1;

FIG. 3 is a diagram of the smearing that can arise while taking an image in the manner shown in FIG. 2;

FIG. 6 shows yet another variant of the camera device in accordance with the present invention as shown in FIG. 4 or FIG. 5;

FIG. 7 is a diagram showing an implementation of the method in accordance with the present invention;

FIG. 8 shows a variant implementation of the method in accordance with the present invention as shown in FIG. 7;

FIG. 9 shows another variant of the implementations of the method in accordance with the present invention as shown in FIG. 7 or FIG. 8;

FIG. 10 shows yet another variant of the implementations of the method of the present invention as shown in FIG. 7, FIG. 8, and FIG. 9; and FIG. 11 is a diagram showing yet another variant of the implementations of the method in accordance with the present invention as shown in FIG. 7, FIG. 8, FIG. 9, and FIG. 10.

Figure 4:
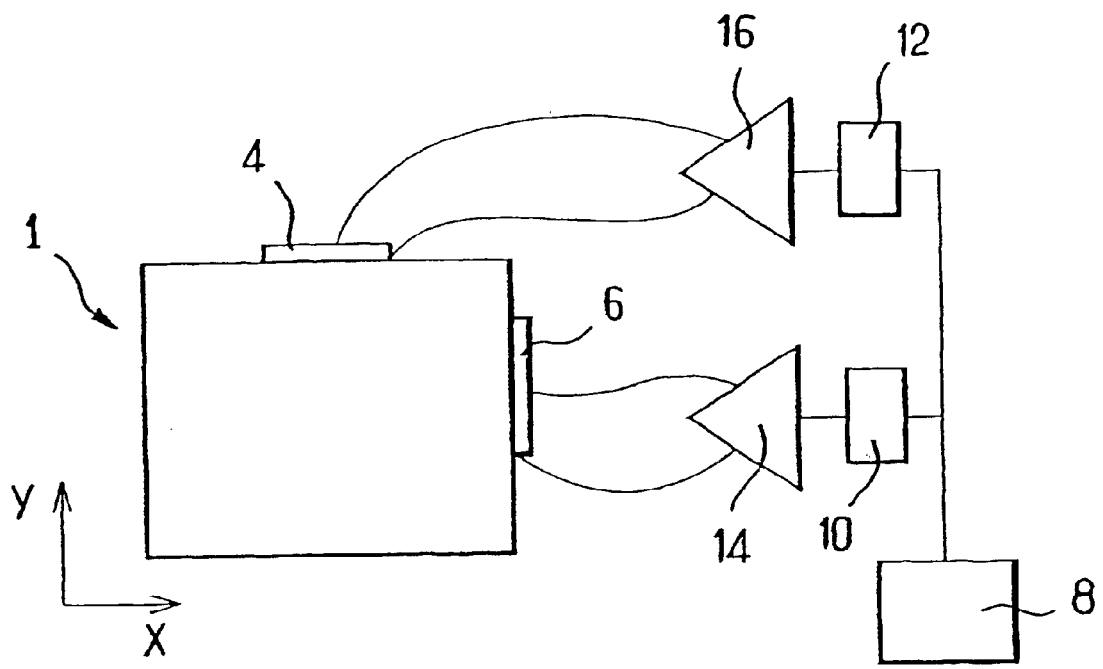
FIG. 4 is a diagram of a camera device in accordance with the present invention.

An embodiment of the invention is described below in the context of imaging from a satellite.

In this example, images are taken by means of a camera device that includes a two-dimensional matrix of photosensitive charge transfer elements. To achieve high resolution, these photosensitive charge transfer elements are photodiodes having a size of about 6 $\mu$m, for example.

FIG. 1 is a diagram of a matrix 1 of sensors 2 made up of such photodiodes. By way of example, a matrix 1 may comprise 4000 rows of sensors 2 by 4000 columns of sensors 2. The photodiodes are associated with an optical device for causing an elementary area of resolution on the ground to coincide with the area of one detector, i.e. with the size of a photodiode.

Thus, for example, for ground resolution $R_s$ of meter order, with a sensor of size T of the order of 6 $\mu$m, and an altitude A of about 600 km, it is necessary to use an optical system whose focal length is given by:

$$F = \frac{A}{R_s} T = 3.6 \text{ m}$$

With focal length being imposed in this manner, it is appropriate to ensure that the diffraction spot associated with the optical aperture of the system is of the same order of magnitude as the size of a detector. Which implies, for a wavelength $\lambda$, that:

$$\frac{D}{F} \text{ is about } \frac{\lambda}{T}$$

where D corresponds to the diameter of the entrance pupil.

Thus, with a sensor of size T lying in the range 5 $\mu$m to 10 $\mu$m, an altitude A of 600 km, and a wavelength of about 0.6 $\mu$m, the pupil has a diameter of about 30 centimeters (cm).

It is assumed below that the satellite is moving along a trajectory V, with the tangent to the trajectory V defining a direction X. The direction Y is defined as being perpendicular to the direction X in a plane perpendicular to the optical axis of the camera device. A direction Z is also defined which is perpendicular to the directions X and Y.

As shown in FIG. 3, when the satellite moves during exposure time, if the matrix 1 follows the satellite, then the image 3 of an object on the ground moves on the matrix 1 (by way of illustration of FIG. 3, it moves from the position drawn in continuous lines to the position drawn in dashed lines). This is what causes smearing. To ensure that the image is not affected by such smearing that destroys the desired resolution, each sensor 2 must move in the opposite direction to the displacement of the satellite along its trajectory, and at the same speed, throughout the duration of the exposure time. Thus, a satellite traveling relative to the ground at a speed of 8000 km/s during an exposure time of 500 $\mu$s (time corresponding to a signal-to-noise ratio of 40 dB) travels through 4 m relative to the ground, which corresponds to 4 pixels, each pixel corresponding to one sensor 2. In order to conserve resolution of meter order, it is therefore appropriate to move the camera device through 4 pixels in the opposite direction to the satellite displacement direction.

Indeed, to obtain a better signal-to-noise ratio, the exposure time ought to be 1 ms. To compensate for smearing during such an exposure time, displacement should be obtained through 8 pixels. The transducer must therefore provide displacement of 48 µm in 1 ms. Such displacement is entirely compatible with the voltage/displacement characteristics of a piezoelectric or magnetostrictive transducer.

It is even possible to envisage compensating smearing over 2 ms, i.e. 16 pixels, which for an optical system having a diameter of 30 cm would make it possible to achieve signal-to-noise ratios of better than 60 dB (which was previously inconceivable for such small optical systems).

The rigidity of a piezoelectric material, associated with the fineness of control that can be obtained over displacement with this type of material mean that it is an ideal candidate for performing this function of compensating smearing.

Such transducers can be constituted, for example, by lithium niobiate capsules sold by SPK Electronics Co. Ltd., having a piezoelectric constant D equal to or greater than $1000 \times 10^{-12}$ meters per volt (m/V).

Such transducers are not only advantageous for compensating smearing due to the satellite traveling along its trajectory while exposure is taking place, but also for compensatinq any residual disturbances during exposure. Under such circumstances, the transducer is advantageously included in a control loop. Until now, the stabilization devices used for compensating residual disturbances have been more expensive and heavier than the solution of the invention.

As shown in FIG. 4, the matrix 1 is associated with two transducer elements 4 and 6 that are controlled independently of each other. Each of these transducers 4 or 6 is disposed on one side of the rectangular parallelepiped constituted by the matrix 1. To simplify the explanation below, the sides of this rectangle are assumed to be parallel to the directions X and Y. Naturally, other orientations are also possible. The two sides each provided with a transducer 4 or 6 are adjacent.

Advantageously, the transducers and the matrix form an integrated structure.

The use of two transducers 4 and 6 generating independent orthogonal displacements makes it possible to implement movements satisfying any arbitrary displacement relationship. This enables software to handle relationships for controlling lateral displacement relative to the trajectory V, displacements in forward and reverse directions, along the trajectory V, or in situations that are complex such as those associated with rotation of the earth.

A driving microprocessor 8 calculates the corrections that need to be made in real time. The deformations of the transducers 4, 6 can be complex, given the mechanical hysteresis to which piezoelectric transducers are subject, for example. However, since these deformations can be modelled, they can also be taken into account in the calculations performed by the microprocessor 8. The results of these calculations are applied to analog-to-digital converters 10 and 12. The analog signal output by each analog-to-digital converter 10, 12 is applied to an amplifier 14, 16 which in turns feeds the piezoelectric transducers 4, 6.

The transducers 4, 6 are controlled using voltage levels that are relatively low since the displacements generated by the transducers 4 and 6 are of small amplitude. For example, with capsules of the type mentioned above, having a dielectric constant D equal to about $1000 \times 10^{-12}$ m/V, and a thickness of 2 mm, applying a voltage of 18 kilovolts (kV) enables displacement to be performed through 90 µm.

Such displacement corresponds to about 10 pixels.

It is also advantageous to use a stack of piezoelectric material layers, with electrodes in parallel. This reduces the voltage that needs to be applied to obtain the desired displacement.

For example, with nine stacked layers, it is possible to reduce the voltage that is applied to each layer to 2 kV. This voltage is then entirely compatible with common high voltage devices. Advantageously, it is also possible to use a gastight housing filled with an inert gas in order to avoid electric arcing.

Figure 5:
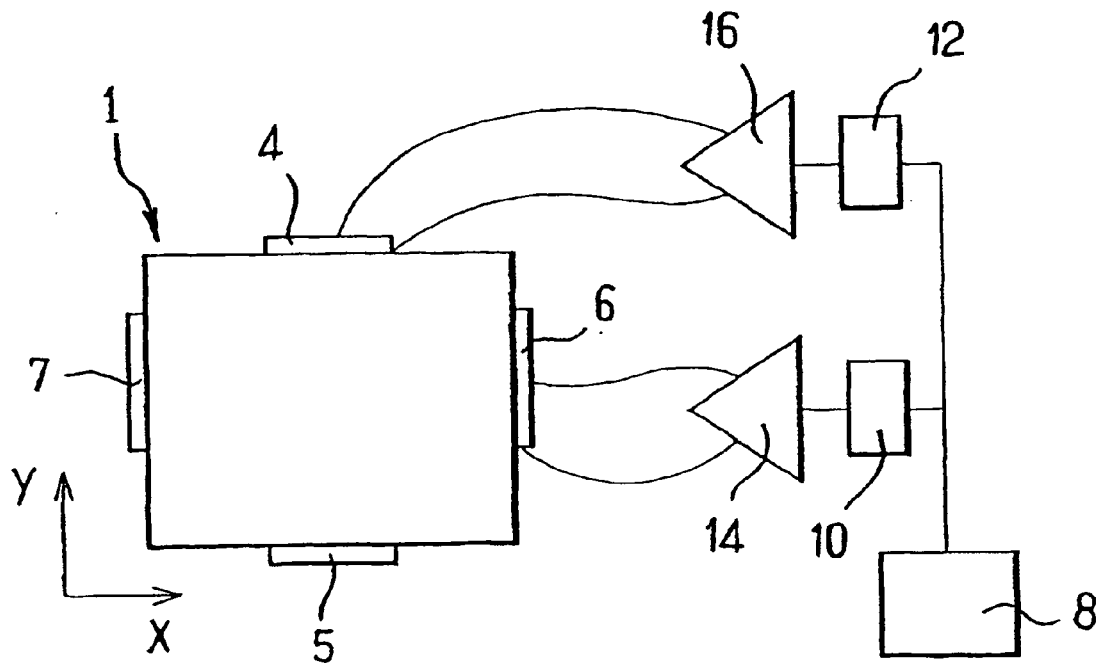
FIG. 5 shows a variant of the camera device in accordance with the present invention as shown in FIG. 4.

As shown in FIG. 5, in an advantageous variant of the camera device of the invention as shown in FIG. 4, the matrix 1 is provided with a transducer 4, 5, 6, or 7 on each of its sides parallel to the directions X and Y. In this variant, the matrix is moved in push-pull mode. The piezoelectric transducers 4, 5 and 6, 7 situated on opposite sides of the matrix 1 perpendicular to one of the directions X or Y are controlled using opposite voltages.

As shown in FIG. 6, in yet another advantageous variant of the camera devices of the invention shown in FIGS. 4 and 5, the matrix 1 is provided with transducers 4, 5, 6, and 7 on each of its edges parallel to the directions X and Y in order to control displacements along those directions. However the matrix is also provided with transducers 8 and 9 arranged to drive displacement in the direction Z. If a plurality of independent transducers 8 and 9 all arranged to drive displacement in the direction Z are fixed to different points of the matrix 1, it is then possible to cause the matrix 1 to tilt relative to a plane containing axes parallel to the directions X and Y. In other words, such tilting is an operation which consists in causing the matrix 1 to be inclined relative to the tangent of the trajectory V of the satellite.

As shown in FIG. 7, this tilting makes it possible to take a first image of the object to be observed from a first position along the trajectory of the satellite (continuous lines in FIG. 7), followed by a second image of the same object from a position downstream from the first position (dashed lines in FIG. 7), thereby enabling a stereoscopic image to be formed of said object.

As shown in FIG. 8, this tilting also makes it possible to take an image that is smaller but that uses more sensors 2. This operation makes it possible to further increase resolution in the image. The distortion in the image taken in this way due to the matrix 1 being tilted relative to the optical axis of the camera device is easily corrected by processing the recorded image. This processing may optionally take place on the ground. This titling of the matrix 1 relative to the tangent of the trajectory of the satellite may advantageously be combined with fine displacement for compensating smearing.

As shown in FIG. 9, displacement in directions parallel to the axes X and Y makes it possible between taking two images of the object under observation to move the camera device laterally relative to the trajectory of the craft so as to form a stereoscopic image of the object.

As shown in FIG. 10, the displacement along directions parallel to the axes X and Y makes it possible between taking two images of the object to be observed to move the camera device so that it turns about an axis perpendicular to the trajectory, so as to form a stereoscopic image of the object to be observed.

As shown in FIG. 11, it is also possible by the method of the invention to take a plurality of images corresponding to positions of the camera device that are juxtaposed relative to one another. The camera device is thus moved laterally relative to the trajectory of the satellite between taking two images so as to form, after all of the images have been processed, an image of the object to be observed corresponding to a field that is wider than that which can be obtained using a single image. It is thus possible to implement an imaging method that was previously unknown, making it possible to achieve meter resolution over fields of width that are multiples of the dimension T of a sensor 2.

For example, a matrix of 4000 sensors by 4000 sensors can cover a ground area of 4 km by 4 km. To cover an area corresponding to a square having a side of 40 km, it would be necessary to have a matrix of 40,000 sensors by 40,000 sensors. Another solution consists in moving a matrix 1 that comprises a smaller number of sensors 2.

Thus, if the satellite advances through 4 km relative to the ground (4000 pixels) in 4.8 ms, it is possible to compensate for smearing while taking nine images with exposure times of 500 μs. This makes it possible to obtain a swath width, i.e. the distance scanned by the matrix laterally relative to the trajectory, that is equal to 36 km using a matrix 1 of 4000 sensors 2.

The invention is described above with reference to an example of a camera device in which images are taken using a matrix of photosensitive charge transfer elements. However sensors other than photosensitive charge transfer elements can be used when implementing the invention. It is equally possible to use sensors having a longer time constant, such as sensors in the medium or far infrared range or bolometer type heat detectors. Until now, such sensors have been incompatible, even at modest resolution, with the sampling frequency imposed by the displacement of satellites. By means of the invention, it is possible to obtain resolutions that have previously been inaccessible. Thus, for example, it is possible to detect forest fires with precision of 5 m to 10 m in the far infrared.

Advantageously, the invention also makes it possible to use sensors that are of low cost and of standard quality, while nevertheless obtaining very high level radiometric quality, for example with a signal-to-noise ratio better than 40 dB.

The invention is described above with reference to an embodiment of a camera device mounted on a satellite, however it is evident that the invention can be implemented in other applications when it is desired to image an object that is remote from the camera device, and the displacements of the camera device are of relatively small amplitude. In particular, it is possible to use spacecraft of types other than satellites.

What is claimed is:

1. A camera device for mounting on board a spacecraft, the camera device having
    at least one observation sensor and
    a displacement member for controlled displacement of said device relative to the spacecraft with at least one degree of freedom, said displacement member comprising at least one transducer of an active material suitable for deforming dynamically in response to a variable electric and/or magnetic field, together with a driver for controlling the transducer so as to displace the observation sensor in the opposite direction to the displacement of the satellite along its trajectory, at the same speed and throughout at least the duration of an exposure time.

2. A device according to claim 1, wherein the active material is a piezoelectric material.

3. A device according to claim 1, wherein the active material is a magnetostrictive material.

4. A device according to claim 1, which further comprises a servo-control member for each transducer adapted to compensate disturbing movements affecting the position of each sensor relative to an object to be observed.

5. A device according to claim 1, wherein the active material is mounted directly on a matrix of observation sensors to form an integrated structure.

6. A device according to claim 1, wherein each observation sensor is a photosensitive charge transfer element.

7. A spacecraft including a camera device with at least one observation sensor and a displacement member for controlled displacement of the camera device relative to the spacecraft in at least one degree of freedom, the displacement member having
    a transducer of an active material that will deform in response to an electric field and/or a magnetic field, together with
    a driver for controlling the transducer so as to displace the observation sensor in the opposite direction to the displacement of the satellite along its trajectory, at the same speed and throughout at least the duration of an exposure time.

8. A method of imaging in space by displacing a camera device relative to a spacecraft, the method comprising the steps of
    applying an electric field and/or a magnetic field to deform an active material interposed between the camera device and the spacecraft, and
    driving the transducer so as to displace the observation sensor in the opposite direction to the displacement of the satellite along its trajectory, at the same speed and throughout at least the duration of an exposure time.

9. A method according to claim 8 further comprising the step of compensating smearing associated with movements of a spacecraft relative to an object to be observed that is remote from said spacecraft, the movements corresponding to displacement of said spacecraft along a trajectory (V).

10. A method according to claim 8 further comprising the step of using the active material to cause a matrix of observation sensors extending mainly in a plane to tilt relative to the tangent of the trajectory (V) of the spacecraft.

11. A method according to claim 10 further comprising the step of taking a first image of the object to be observed from a first position on the trajectory (V), and a second image of said object from a position downstream from said first position, to form a stereoscopic image of the object.

12. A method according to claim 9 further comprising the step of, between taking two images of the object to be observed, displacing the camera device laterally relative to the trajectory (V) of the spacecraft to form a stereoscopic image of the object.

13. A method according to claim 9 further comprising the step of causing the camera device to turn about an axis perpendicular to the trajectory (V) to form a stereoscopic image of the object to be observed.

14. A method according to claim 9 further comprising the step of taking a plurality of images corresponding to the camera device occupying positions that are juxtaposed beside one another by displacing the camera device between taking two images, the device being displaced laterally relative to the trajectory of the spacecraft so as to form, after processing all of the images, an image of the object to be observed that corresponds to a field that is wider than that which would be obtained using only one of said images.

15. A method according to claim 9 further comprising the step of using the active material to cause a matrix of observation sensors extending mainly in a plane to tilt relative to the tangent of the trajectory (V) of the spacecraft.

16. A method according to claim 10 further comprising the step of, between taking two images of the object to be observed, displacing the camera device laterally relative to the trajectory (V) of the spacecraft to form a stereoscopic image of the object.

17. A method according to claim 11 further comprising the step of, between taking two images of the object to be observed, displacing the camera device laterally relative to the trajectory (V) of the spacecraft to form a stereoscopic image of the object.

18. A method according to claim 10 further comprising the step of causing the camera device to turn about an axis perpendicular to the trajectory (V) to form a stereoscopic image of the object to be observed.

19. A method according to claim 11 further comprising the step of causing the camera device to turn about an axis perpendicular to the trajectory (V) to form a stereoscopic image of the object to be observed.

20. A method according to claim 12 further comprising the step of causing the camera device to turn about an axis perpendicular to the trajectory (V) to form a stereoscopic image of the object to be observed.

21. A method according to claim 10 further comprising the step of taking a plurality of images corresponding to the camera device occupying positions that are juxtaposed beside one another by displacing the camera device between taking two images, the device being displaced laterally relative to the trajectory of the spacecraft so as to form, after processing all of the images, an image of the object to be observed that corresponds to a field that is wider than that which would be obtained using only one of said images.

22. A method according to claim 11 further comprising the step of taking a plurality of images corresponding to the camera device occupying positions that are juxtaposed beside one another by displacing the camera device between taking two images, the device being displaced laterally relative to the trajectory of the spacecraft so as to form, after processing all of the images, an image of the object to be observed that corresponds to a field that is wider than that which would be obtained using only one of said images.

23. A method according to claim 12 further comprising the step of taking a plurality of images corresponding to the camera device occupying positions that are juxtaposed beside one another by displacing the camera device between taking two images, the device being displaced laterally relative to the trajectory of the spacecraft so as to form, after processing all of the images, an image of the object to be observed that corresponds to a field that is wider than that which would be obtained using only one of said images.

24. A method according to claim 13 further comprising the step of taking a plurality of images corresponding to the camera device occupying positions that are juxtaposed beside one another by displacing the camera device between taking two images, the device being displaced laterally relative to the trajectory of the spacecraft so as to form, after processing all of the images, an image of the object to be observed that corresponds to a field that is wider than that which would be obtained using only one of said images.

* * * * *